(No Model.)

G. JANEWAY.
AIR VENT FOR VESSELS CONTAINING LIQUIDS.

No. 256,697. Patented Apr. 18, 1882.

WITNESSES:
W. W. Hollingsworth
W. Read

INVENTOR:
Geo. Janeway
BY
ATTORNEYS.

UNITED STATES PATENT OFFICE.

GEORGE JANEWAY, OF JUNCTION CITY, OHIO.

AIR-VENT FOR VESSELS CONTAINING LIQUIDS.

SPECIFICATION forming part of Letters Patent No. 256,697, dated April 18, 1882.

Application filed October 18, 1881. (No model.)

*To all whom it may concern:*

Be it known that I, GEORGE JANEWAY, of Junction City, in the county of Perry and State of Ohio, have invented a new and useful Improvement in Air-Vents for Vessels Containing Liquids; and I do hereby declare that the following is a full, clear, and exact description of the same, reference being had to the drawings forming part of this specification, in which—

Figure 1:
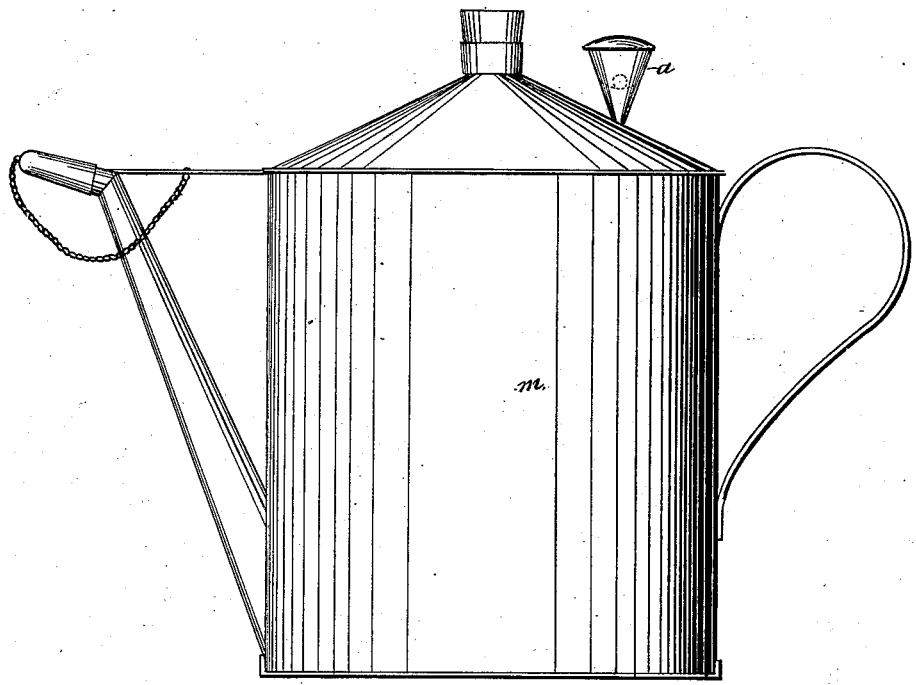
Figure 2:
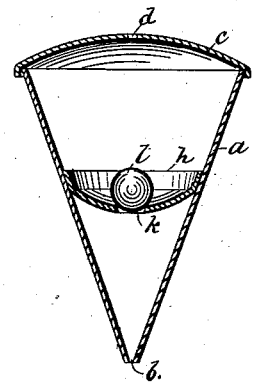

Figure 1 is a side elevation of my improved air-vent applied to a vessel. Fig. 2 is a vertical central section of the air-vent.

My invention relates to improvements in air-vents for vessels from which liquids are to be poured; and it consists in the peculiar construction and arrangement of the parts, as hereinafter more fully set forth.

In the accompanying drawings, $a$ represents my improved air-vent, made of cone shape, and preferably of sheet metal, and provided with an opening or hole, $b$, in its tapering end for the passage of air into the vessel containing a liquid. The upper end of the cone $a$ is open and provided with a flanged cover, $c$, fitting closely over the top of the cone and secured thereto. The cover $c$ is provided with a central air-orifice, $d$, lying over the hole $b$ in the lower end of the cone.

$h$ represents a dished circular diaphragm or partition of less diameter than the large end of the cone, and adapted to rest in the inside of the cone below its larger end. The diaphragm $h$ is dished or made concave downwardly, and is provided with a central orifice, $k$. The diaphragm has also, preferably, an outer flange projecting upwardly when the diaphragm is in position in the cone.

$l$ represents a ball-valve, which fits over and closes the orifice $k$ when the diaphragm is horizontal, and when the can or vessel to which the air-vent is secured is tilted to pour out the liquid the ball-valve rolls by gravity on the diaphragm, uncovering its central hole, $k$, and allows air to pass through the orifices in the cover, diaphragm, and end of the cone into the vessel containing the liquid, thus introducing air into the vessel and allowing the liquid contained in the vessel to be readily poured through its nozzle.

The conical air-vent $a$ may be inserted in the top or breast of the vessel $m$, containing the liquid, on one side and back of the discharge tube or nozzle in the breast of the can or vessel, or it may be situated at any part of the vessel where it will answer best to introduce air into the vessel. The air-vent $a$ will operate as well for most purposes without the partition or diaphragm and its ball-valve; but when the liquid contained in the vessel is light and costly it is necessary to employ the diaphragm and valve to prevent evaporation of the liquid in the vessel, the orifice in the diaphragm being always closed by the ball-valve, excepting when the vessel is tipped to pour out the liquid, whereby no evaporation can take place. The cone shape of the vent is employed so that when the liquid is forced into it by shaking the vessel it will not pass up into it and out of the top of the vent, as it would do if of tubular form. The orifice in the end of the cone is small and the liquid forced up through it will spread out in the cone-chamber, and it is found impossible in practice to agitate the liquid so as to force it out through the hole in the cover of the cone.

The function of the convex cover $c$ of the cone is to prevent the egress of liquid from the top of the vent when the can is agitated, and also to prevent the ingress of any foreign matter into the vent.

I claim as my invention—

The combination, with the conical vent $a$, provided with the orifice $b$ in its tapering end, and cover $c$, having the orifice $d$, of the concave diaphragm $h$, provided with the central orifice, $k$, and ball-valve $l$, substantially as described, and for the purpose set forth.

GEORGE JANEWAY.

Witnesses:
GEORGE R. JANEWAY,
JOSHUA B. LARIMER.